Figure 1:
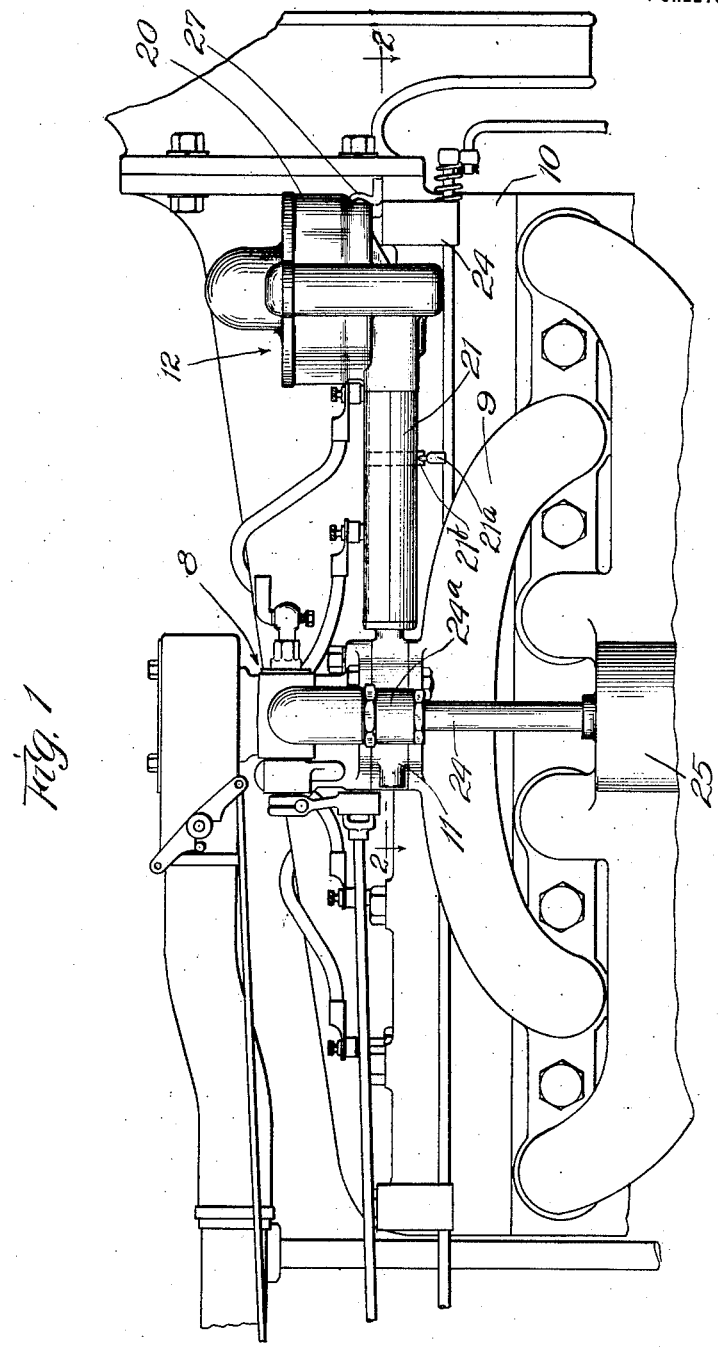

J. S. JENNINGS, Jr.
METHOD OF AND MEANS FOR GOVERNING EXPLOSIVE ENGINES.
APPLICATION FILED FEB. 24, 1920.

1,379,186.  Patented May 24, 1921.
4 SHEETS—SHEET 1.

Inventor
Jarvis S. Jennings Jr.
By Miller, Chindahl & Parker
Attys

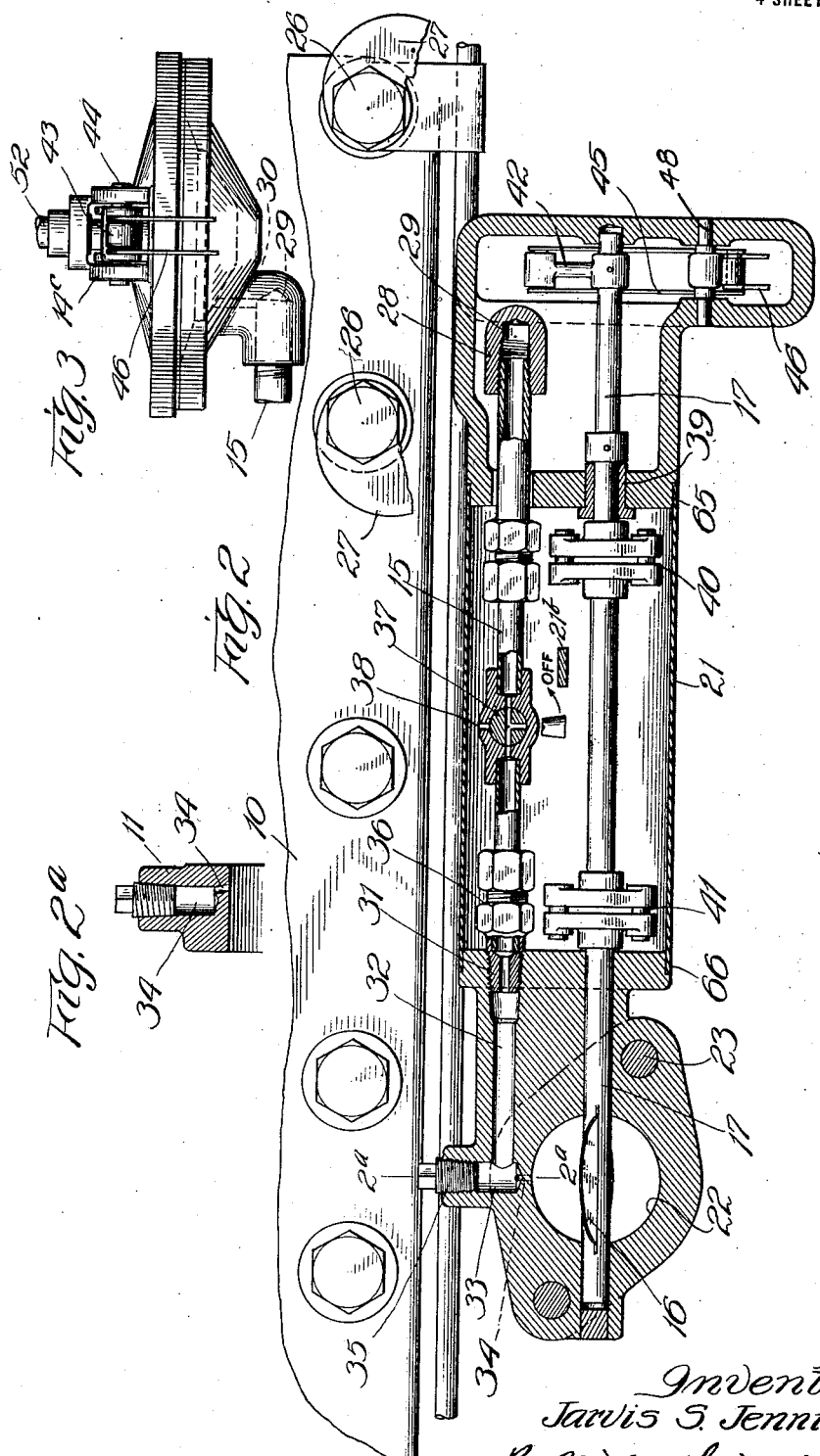

J. S. JENNINGS, Jr.
METHOD OF AND MEANS FOR GOVERNING EXPLOSIVE ENGINES.
APPLICATION FILED FEB. 24, 1920.
1,379,186.
Patented May 24, 1921.
4 SHEETS—SHEET 3.
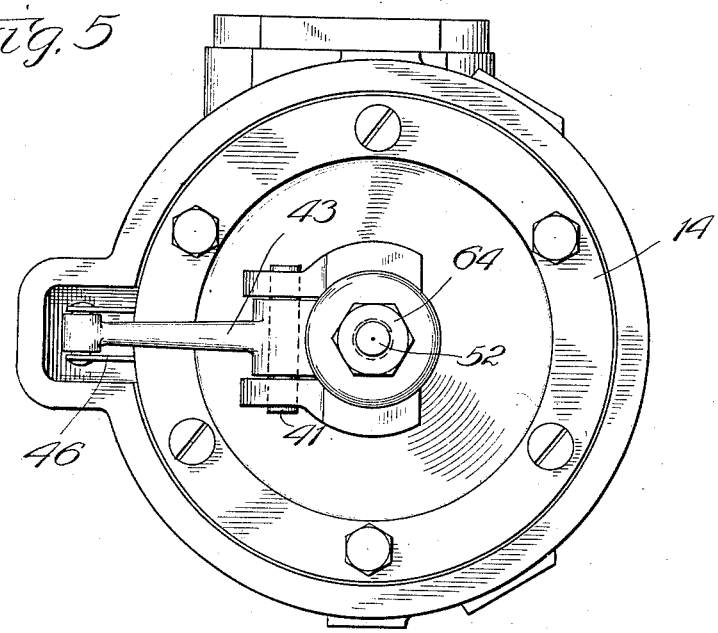
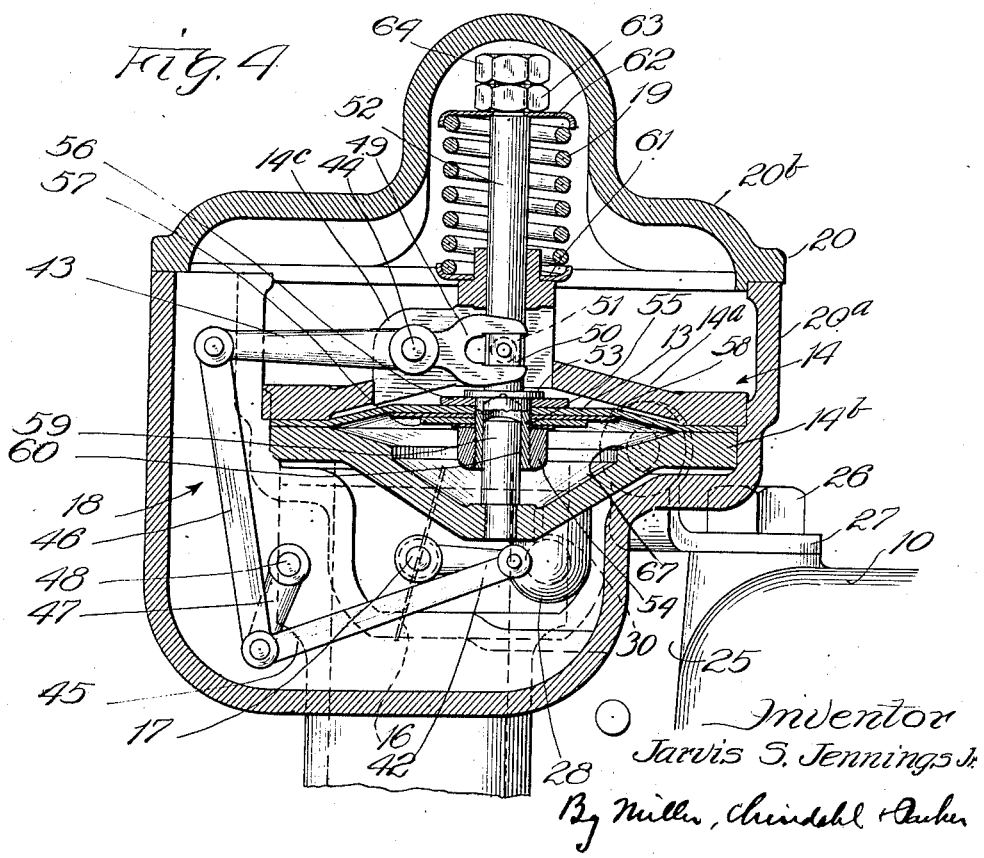

J. S. JENNINGS, Jr.
METHOD OF AND MEANS FOR GOVERNING EXPLOSIVE ENGINES.
APPLICATION FILED FEB. 24, 1920.
1,379,186.
Patented May 24, 1921.
4 SHEETS—SHEET 4.
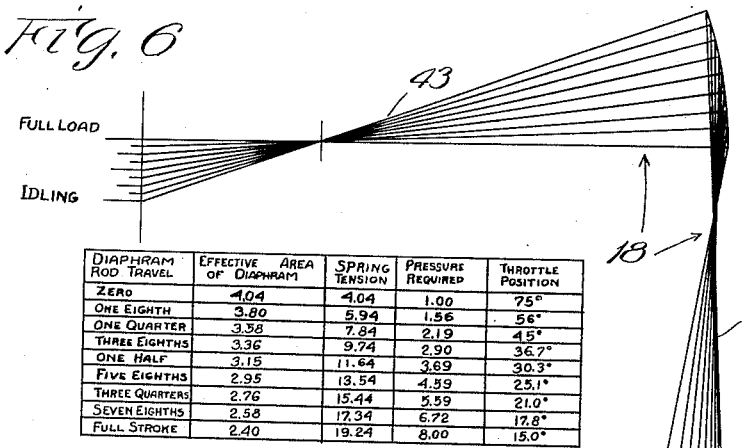
| Diaphram Rod Travel | Effective Area of Diaphram | Spring Tension | Pressure Required | Throttle Position |
|---|---|---|---|---|
| Zero | 4.04 | 4.04 | 1.00 | 75° |
| One Eighth | 3.80 | 5.94 | 1.56 | 56° |
| One Quarter | 3.58 | 7.84 | 2.19 | 45° |
| Three Eighths | 3.36 | 9.74 | 2.90 | 36.7° |
| One Half | 3.15 | 11.64 | 3.69 | 30.3° |
| Five Eighths | 2.95 | 13.54 | 4.59 | 25.1° |
| Three Quarters | 2.76 | 15.44 | 5.59 | 21.0° |
| Seven Eighths | 2.58 | 17.34 | 6.72 | 17.8° |
| Full Stroke | 2.40 | 19.24 | 8.00 | 15.0° |
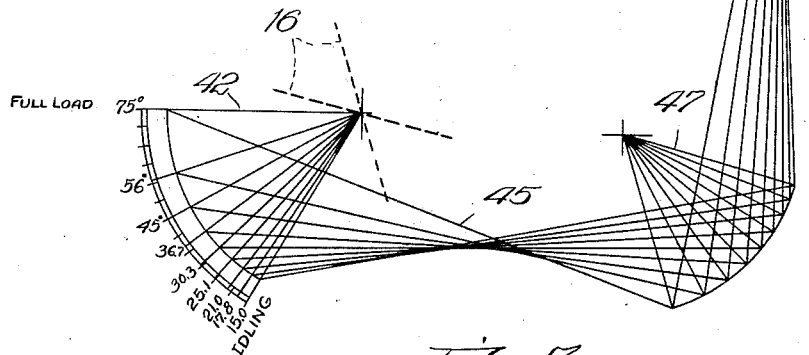
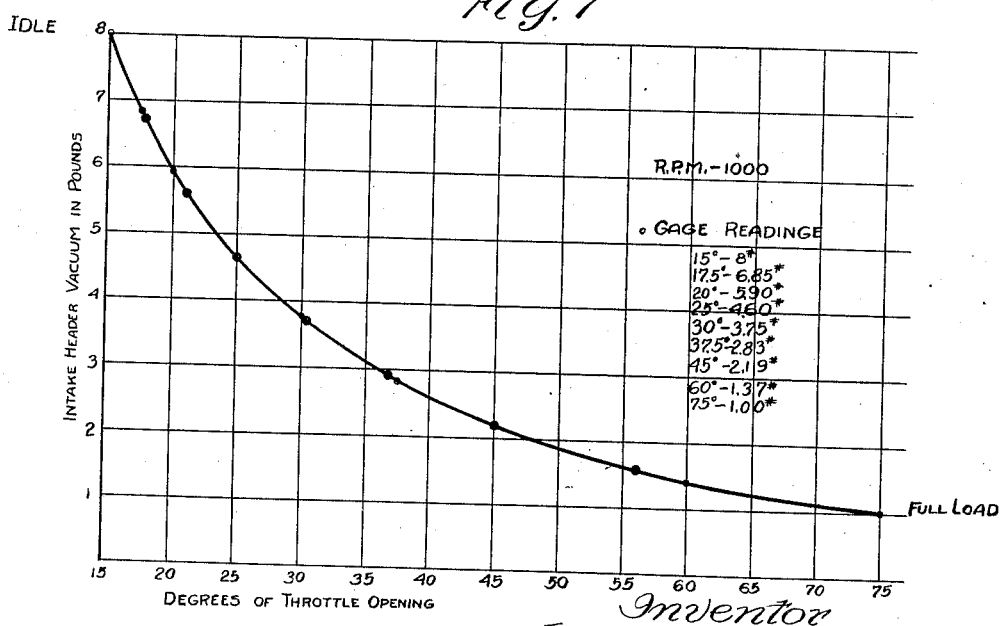
Inventor
Jarvis S. Jennings Jr.

UNITED STATES PATENT OFFICE.

JARVIS S. JENNINGS, JR., OF DETROIT, MICHIGAN.

METHOD OF AND MEANS FOR GOVERNING EXPLOSIVE-ENGINES.

1,379,186.  Specification of Letters Patent.  Patented May 24, 1921.

Application filed February 24, 1920. Serial No. 360,943.

*To all whom it may concern:*

Be it known that I, JARVIS S. JENNINGS, Jr., a citizen of the United States, residing at Detroit, in the county of Wayne and State of Michigan, have invented certain new and useful Improvements in Methods of and Means for Governing Explosive-Engines, of which the following is a specification.

The invention relates to governors for explosive engines such as those employed in motor trucks, tractors, and the like and it has for its general aim the provision of a governor which is adapted to maintain a set or predetermined speed of the engine under varying load conditions.

More particularly, the invention has reference to the type of governor in which the speed responsive device consists of a spring-controlled member such as a diaphragm or piston which is subjected to the varying degrees of vacuum in the intake passage of the engine and operatively connected with a valve member in the passage so that as the degree of vacuum in the passage rises or falls with an increase or decrease in the speed of the engine, the valve member is closed or opened to limit an increase or decrease in speed to a minimum range above or below a predetermined rate. Governors of this type possess the advantage that they are extremely sensitive and hence, act with great rapidity.

However, the devices of this class which have been heretofore produced are not in reality governors but are merely speed limiting devices and none has been capable of maintaining an approximately constant engine speed under all of the varying load conditions, from idle to full load. For example, it has been found that if such devices are capable of preventing excessive speed, they are not able, after the device has operated to close the throttle, to prevent a substantial slowing up of the engine when the latter is placed under load. Or, if the devices are capable of controlling the speed when the engine is under heavy loads, they are incapable of preventing an objectionable increase in speed when the engine is operating under light load.

One of the principal reasons for the ineffectiveness of these prior devices as true governors lies in the failure to properly correlate the varying effective sizes of the throttle valve opening to the deflection of the spring in the suction responsive device.

Heretofore, the suction responsive member has been directly connected, or substantially so, to the valve member, so that the movements of said members are at all times substantially directly proportional. As is well known, the deflection of a spring is directly proportional to the load thereon. Applying this principle to governors of the type discussed, the extent of travel of the movable member of the suction responsive device is directly proportional to the degree of vacuum in the intake passage. For a given deflection of the spring, a certain degree of vacuum is required and for double such deflection, double that degree of vacuum is required.

I have discovered that the effective area of the throttle valve opening in the intake passage, for the speed at which it is usually desired to maintain the engine, is approximately the reciprocal of the degree of vacuum in the intake passage, and inasmuch as this degree of vacuum is directly proportional to the deflection of the spring which acts on the suction responsive device, there must be a differential relationship between the movements of the suction responsive device and the proper variation of the effective opening through the passage in order to bring about under varying loads a condition of balance at the predetermined engine speed; that is to say, in order that the suction responsive device will control the effective opening through the passage in such a manner as to induce in the intake passage the proper degree of vacuum to exactly balance the opposing spring tension at the predetermined speed. This condition of balance for all positions of the throttle valve at the predetermined speed is necessary in order that any slight variation from the predetermined speed will operate to increase or decrease the effective opening through the passage by the proper degree to correct such variation in speed.

I have provided a construction for maintaining at all times a correct differential relationship between the movements of the suction responsive device and the effective sizes of the throttle valve opening so that any variation in the degree of vacuum in the intake passage due to a tendency toward increase or decrease of the engine speed will promptly effect a disproportionate variation in the size of the throttle opening so that an approximately constant balance between the degree of vacuum in the intake passage and the degree of deflection of the spring acting on the suction responsive device will be maintained under all of the varying load conditions from idle to full load at a predetermined speed.

While the object sought may be accomplished through the medium of different mechanical structures, I prefer and have illustrated in the drawings a construction in which the variation of the effective size of the intake passage, that is to say, the variation of the throttle valve opening, is effected by moving a butterfly valve member in degrees disproportionate to the deflection of the spring of the suction responsive device. In the particular embodiment of my invention which is herein disclosed, I provide a special form of connection between the said members which consists of a series of links and levers so arranged that the valve member is moved at a gradually increasing rate of speed from closed to open position, and at a gradually decreasing rate of speed from open to closed position; that is to say, for a given movement of the suction-responsive member when the valve member is near its closed position, a relatively slight movement is imparted to the valve member, whereas, when the valve member is near its open position, an equal amount of movement imparted to the suction-responsive member causes the valve member to move through a comparatively great range of movement.

In the accompanying drawings, I have illustrated a preferred form of my invention but it is to be understood that the invention is not to be limited in the interpretation of the appended claims to the details of construction and arrangement set forth except as may be necessitated by the state of the prior art.

In Figure 1 I have shown a fragmentary side elevation of an engine equipped with my improved governor. Fig. 2 is a fragmentary horizontal section taken on line 2—2 of Fig. 1. Fig. 2ª is a fragmentary enlarged sectional view taken on line 2ª—2ª of Fig. 2. Fig. 3 is a side elevation of the diaphragm chamber. Fig. 4 is an enlarged vertical sectional view through the governor device showing details of construction. Fig. 5 is a top plan view of the governor device with the upper portion of the casing removed. Fig. 6 is a diagrammatic view illustrating the operation of the connection between the diaphragm and the valve member in effecting the disproportionate movements of the valve member. Fig. 7 is a curve of pressures taken from an engine under various loads at a set speed of 1000 R. P. M. for reference in connection with the diagram in Fig. 6.

I have shown for convenience, my improved governor embodied in the engine of a tractor known as the Fordson tractor. In this engine, the air and fuel vapor pass first through a mixing device indicated generally by the numeral 8, and thence downwardly into the intake manifold 9 which conducts it into the various cylinders of the engine. 10 designates the cylinder block.

The parts of my improved governor are so arranged that it may be readily incorporated in the engine without necessitating any changes in construction or any substantial variation in the arrangement of parts. Thus, it comprises a valve casing 11, which is interposed in the passage between the mixer and the intake manifold; and a governor device 12 which is mounted upon the cylinder block 10. Said governor device comprises generally a suction responsive member 13 (Fig. 4) in the form of a diaphragm mounted within a chamber 14, the portion of which below the diaphragm communicates by a connection including a pipe 15 with the valve casing 11 at a point below the valve member 16 therein, the diaphragm being thus subjected to the varying degrees of vacuum in the intake passage between the valve and the cylinders. Said valve 16 is carried by a shaft 17, and the latter is adapted to be rocked in the movements of the diaphragm by a connection 18 consisting of a series of links and levers operatively associated with the diaphragm and said shaft. A compression spring 19 is arranged to control the movements of the diaphragm 13. 20 designates a casing which incloses the diaphragm chamber and associated parts. Extending between said casing and the valve casing 11 is a housing 21 for inclosing portions of the pipe 15 and the shaft 17.

As shown in Figs. 1 and 2, the valve casing 11 is shaped to correspond with the shape of the intake passage between the mixing device 8 and the intake manifold 9, being on its interior provided with a cylindrical passageway 22 with which the valve member 16 is adapted to coact.

It will be seen that the casing may be interposed in the intake passageway by merely removing the bolts normally connecting the mixing device with the intake manifold and raising the device sufficiently to receive the casing. Bolts 23 may then be entered through the parts including the casing, as shown in Fig. 2, to clamp the casing with the valve member therein in operative position. To permit of such insertion of the casing 11, however, an extension of a pipe 24 leading from the vaporizer 25 to the mixing device 8 becomes necessary. This is accomplished by means of a short tube or nipple 24ª.

The governor device 12 may also be readily mounted upon the engine by utilizing regular parts of the engine. Thus, the bolts 26 which secure the cylinder head to the cylinder block 10 may be utilized to clamp in position a pair of brackets 27 carried by the casing 20 of the governor device. The suction responsive device or diaphragm 13 is suitably mounted within the chamber 14 forming below said diaphragm a closed chamber communicating with the intake passage below the valve 16. Said chamber 14 is formed of upper and lower sections 14ª and 14ᵇ suitably secured together with the peripheral edge of the diaphragm clamped therebetween, and the casing of the governor device is shaped in its lower portion to neatly receive said chamber.

The connection between the diaphragm casing 14 and the valve casing 11 is formed primarily by the pipe 15, one end of which opens into a depending portion 28 (Figs. 2 and 3) of the diaphragm chamber. Said portion has a horizontal bore 29 which communicates by way of a port 30 with the diaphragm chamber 14, and the opposite end of said pipe 15 is provided with a nipple 31 which is entered into a passage 32 formed in the wall of the casing 11. Said passage 32 terminates in a bore 33 the inner end of which communicates by way of a port 34 (Figs. 2 and 2ª) with the interior of the casing 11 below the valve 16, the port 34 being inclined downwardly as shown in Fig. 2ª. The bore 33, which is formed radially of the cylindrical interior of the casing, is closed at its outer end by means of a screw plug 35. Interposed in the pipe 15 are a pair of extension couplings 36 and also a cock 37 which is adapted to establish communication either between the opposite sections of the pipe 15 or between the diaphragm chamber 14 and the atmosphere by way of a port 38. By means of this cock 37 the governor device may be rendered inoperative at will.

The valve 16 is of the butterfly type, being suitably mounted on the rockshaft 17 which is journaled at one end in the walls of the casing 11 and at its other end in a bearing 39 carried by the casing 20 of the governor device. Said shaft 17 has loose or universal connections 40 and 41 interposed therein which like the extension couplings 36, avoid the necessity of positioning the casings 11 and 20 in exact relationship.

The connection between the shaft 17 and the diaphragm 13 may comprise a crank arm 42 fixed upon the rock shaft 17, a lever 43 pivotally mounted upon the diaphragm casing as at 44 and operatively connected at one end with the diaphragm, and a pair of links 45 and 46 connecting respectively the free ends of the arm 42 and the lever 43 with an arm 47 mounted to swing on a pivot 48 carried by the casing 20. For supporting the pivot 44 the casing 14 has on its upper section 14ª a pair of spaced lugs 14ᶜ between which is formed an opening in the casing for receiving one end of the lever 43. The latter is bifurcated to form two arms 49, each of which is forked so as to receive neatly a block 50 pivotally mounted upon a pin 51 which in turn is carried by a stem 52 rigidly connected with the diaphragm 13. Such connection may comprise a collar 53 formed upon the stem 52 and a nut 54 screw-threaded upon the lower end of the stem which is enlarged as at 55 to clamp the diaphragm between washers 56 and 57 upon opposite sides of the diaphragm. A stiffening plate 58 is interposed between the washer 57 and the diaphragm. For guiding the lower end of the stem 52, a guide stud 59 is mounted centrally of the lower section 14ᵇ of the diaphragm casing and projects into a bore 60 formed in the lower end of the stem 52 so as to neatly receive the stud 59. By this construction, the weight carried by the diaphragm is reduced to a minimum.

The spring 19 for controlling the movements of the diaphragm 13 bears at one end upon a plate 61 carried by the diaphragm casing and at its other end against a washer 62 mounted on the stem 52 and adapted to be adjustably positioned thereon by means of a nut 63. A lock nut 64 may also be provided on the stem for the nut 63.

The casing 20 is made of a shape to neatly receive the various parts of the governor device, the arrangement of the parts of the connection 18 relative to the diaphragm casing being such as to form a very compact construction. Said casing consists of a lower section 20ª and a top or cover section 20ᵇ removable at will to permit of inspection of the parts or a necessary adjustment of the nut 63 to vary the tension of the spring 19 as may be desired.

The housing 21 for inclosing the portions of the pipe 15 and the shaft 17 which extend between the casings 20 and 11, may be in the form of a sheet of metal semi-cylindrical in shape and fitting neatly at its opposite ends over portions of said casings as at 65 and 66. This housing, it will be seen, serves to conceal the parts, and also prevents tampering with the cock 37 by unauthorized persons. Preferably the housing is made sectional in form and the upper section detachable when desired. To lock the sections together suitable means may be employed such as a part 21ª rigid with one section and extending through the other with a pad-lock 21ᵇ on its free end.

Referring now to Figs. 4, 6 and 7, the peculiar arrangement of the parts of the connection 18 which effects the desired disproportionate movement of the valve member with reference to that of the diaphragm under varying load conditions, will be described.

In Fig. 6 is shown diagrammatically the crank arm 42 and lever 43, the links 45 and 46, and the pivoted arm 47, which constitute the connection 18, the positions which the parts occupy under varying load conditions being shown; and in Fig. 7 the plotted curve, taken in connection with the diagram in Fig. 6, illustrates the varying degree of movement transmitted to the valve member while the rate of movement of the diaphragm per pound of variance in force exerted under various loads remains substantially uniform. In this latter figure the larger or heavier points on the curve represent the valve openings and the corresponding positions of the diaphragm shown in Fig. 6, while the smaller points represent the gage readings in the accompanying table.

When the throttle valve is in or near its closed position it will be seen that the degree of vacuum in the intake passage rises to a maximum owing to the impedance to the flow of the mixture, which is induced by the valve member. In Fig. 7, the force exerted upon the diaphragm when the valve member is open 15° from its horizontal or closed position, is shown as being equal to eight pounds, and for each pound of decrease in such force the diaphragm moves at a substantially uniform rate while the valve member moves at a gradually increasing rate toward its open position, until during the final unit of movement of the diaphragm upon a decrease from two pounds to one pound of force thereon, the extent of movement of the valve member is equal to substantially 28°. As will be seen by reference to Fig. 6 such disproportionate movement of the valve member as compared to that of the diaphragm is effected by properly proportioning and arranging the links and levers so as to vary the effect of one upon the other in the different positions thereof. Obviously the invention is not limited to any particular arrangement of the parts of the connection 18 for accomplishing the proper movement of the valve member, the arrangement herein shown being designed to produce a compact structure while at the same time accomplishing the desired result.

From the foregoing it will be seen that if the engine is operating idly and is suddenly placed under load the resulting tendency of the engine to decrease in speed will cause a reduction in the degree of vacuum in the intake passage and consequently permit the diaphragm controlling spring 19 to move the diaphragm upwardly to a greater or less extent depending upon the amount of the load and hence, upon the amount of slowing up of the engine. Such movement imparted to the diaphragm is transmitted by the connection 18 to the valve member, and if the load placed upon the engine is such as to cause a substantial slowing down tendency, the valve member will move rapidly to its open position at substantially 75° from the horizontal. Conversely, if the load is suddenly removed from the engine resulting in a tendency to increase its speed, the resulting increase in suction or degree of vacuum in the intake passage is immediately imparted to the diaphragm and thence through the connection 18 to the valve member so that the latter quickly moves into position to cut off the flow of combustible mixture sufficiently to prevent an objectionable increase in the speed of the engine.

Referring to Fig. 4 the lower wall of the diaphragm chamber is shaped on its interior to receive the nut 54, washer 57 and stiffening plate 58 while the annular portion of the diaphragm between the periphery of the plate 58 and the portion which is gripped by the sections of the casing gradually become seated on an inclined surface 67. It will be seen that by reason of the fact that the diaphragm is flexible, as it moves downwardly under the action of the vacuum in the lower portion of the chamber, a gradually increasing area of the diaphragm becomes ineffective so that when the diaphragm reaches its lowermost position the effective area is substantially equal to that of the area of the plate 58. This arrangement is advantageous in that it prevents undue stresses on the diaphragm, for the reason that as the vacuum increases the loose and unsupported portion of the diaphragm is reduced until, when the suction is the greatest, the gap between the supporting members under the diaphragm is practically eliminated. The diaphragm is formed under heavy pressure with a permanent offset as shown in the drawing, and as it is of a substantially inelastic, though flexible, material, its diminishing effective areas as the vacuum pulls it downward are readily calculated.

A further advantage of this method of using a diaphragm of changing area is that it assists in obtaining the effect desired, as the proper relative movements can be obtained without the necessity of having the levers approach dead center as closely as would otherwise be essential.

The general method of laying out the linkage is as follows:—The diaphragm areas are calculated for several points in the diaphragm rod travel representing equal divisions of the total. The initial and final spring tensions necessary to balance the diaphragm pull are then obtained, and a table of spring tensions corresponding to the points for which the diaphragm areas were calculated is worked out. By dividing the various amounts of spring tension by the corresponding areas, the degrees of vacuum necessary to balance the system are then obtained. Referring these figures for pressures to the curve in Fig. 7, the number of degrees of throttle opening at which these pressures are induced is obtained, and the linkage is then so proportioned that the points in the diaphragm rod travel correspond to the desired throttle valve openings. By suitable variations of the centers of oscillation and the lengths and angularities of the levers a very exact conformance of the theoretical and actual throttle openings can be secured.

It will be seen that the condition of balance at the set speed for all throttle valve openings thus brought about will be immediately disturbed by any slight variation in the speed of the engine and the throttle valve will be caused to move in the direction and degree necessary to restore the normal engine speed, within the limits of the power of the engine to pull the imposed load. The instant that the engine reaches the set speed the condition of balance is restored and further motion of the throttle valve is checked. Thus the "surging" or variation in speed above or below the desired limit, common to centrifugal governors, is reduced to an unobjectionable minimum, as the inertia of the moving parts is very slight, and is damped by the inherent construction of the device.

Vibration of the diaphragm, due to intermittent pulsations from the individual engine pistons, is avoided by reducing the size of the opening in the pipe between the intake manifold and the diaphragm chamber.

The means for limiting the downward movement of the diaphragm, and hence for preventing an absolute closing of the intake passage, may comprise the nut 54 on the diaphragm stem 52 coacting with the bottom wall of the diaphragm chamber, the throttle valve being set with reference to its crank arm 42 so that when the diaphragm is at the downward limit of its movement, the valve is open the proper degree, as for instance, substantially 15 degrees from the horizontal.

It will be seen that I have provided a governor device which is capable of effectively maintaining a set or predetermined speed of an engine under varying load conditions. While it is obviously impossible to maintain an absolutely constant rate of speed owing to the fact that the operation of the governor depends necessarily upon variations in speed, such variations are reduced to a minimum by the present governor. By employing a speed responsive device which is subject to the varying degrees of vacuum in the intake passage, rapidity of operation is attained, while the inability of former governors of this general character to effectively control the engine speed is entirely overcome by causing the valve member in its movements to quickly and adequately respond to the demands of the engine whether it be for the mere operation thereof under no external load or for such operation plus varying amounts of load.

This application is a continuation in part of my prior application, Serial No. 334,621, filed October 30, 1919.

I claim as my invention:

1. The combination with the intake passage of an explosive engine having a valve therein, of a governor for controlling said valve comprising a chamber having a member therein responsive to the varying degrees of vacuum in the intake passage, a casing inclosing said chamber, a shaft journaled at one end in said casing and operatively associated with said valve, a series of links and levers connecting said member with said shaft, said links and levers being inclosed within said casing and arranged exteriorly of said chamber so as to partially surround it, and a spring also inclosed within the casing and adapted to control the movements of said member.

2. The combination with an engine having an intake passage, of controlling means for the engine comprising a casing arranged to be interposed in said passage and having a valve therein, a second casing having a chamber therein, a member in said chamber, means establishing communication between said chamber and said intake passage whereby to subject said member to the varying degrees of vacuum in the intake passage, a shaft journaled at its opposite ends in said casings and carrying at one end said valve, a connection between said member and said shaft inclosed within the second mentioned casing, and means for inclosing the portion of the pipe connection and the shaft extending between said casings.

3. The combination with an engine having an intake passage, of controlling means for the engine comprising a casing arranged to be interposed in said passage and having a valve therein, a second casing adapted to be supported in a fixed position on the engine and having a chamber therein, a member in said chamber, means including an extensible pipe connection establishing communication between said chamber and said intake passage whereby to subject said member to the varying degrees of vacuum in the intake passage, a shaft journaled at its opposite ends in said casings and carrying at one end said valve, said shaft having a flexible joint, and a connection between said member and said shaft inclosed within the second mentioned casing.

4. The combination with an engine having an intake passage, of controlling means for the engine comprising a casing arranged to be interposed in said passage and having a valve therein, a second casing having a chamber therein, a member in said chamber, means establishing communication between said chamber and said intake passage whereby to subject said member to the varying degrees of vacuum in the intake passage, a shaft journaled at its opposite ends in said casings and carrying at one end said valve, a connection between said member and said shaft inclosed within the second mentioned casing, and means for inclosing the portion of the pipe connection and the shaft extending between said casings, said pipe connection having a cock therein adapted to establish communication between the intake passage and the atmosphere.

5. A governor for internal combustion engines having in combination with the intake passage, a spring-controlled suction-responsive device including a movable element adapted to be controlled by the varying degrees of vacuum in said intake passage, and a valve device arranged to vary the effective opening through said intake passage and connected to said element to be moved thereby, the parts being so constructed that the varying positions of said valve device are directly related to the varying degrees of tension of said spring whereby the effective opening in said intake passage will maintain a constant balance between the pull exerted by the degree of vacuum in said intake passage and the degree of tension on said spring at a given engine speed under all load conditions.

6. A governor for internal combustion engines, having, in combination with the intake passage, throttle means arranged to vary the effective size of the opening through said intake passage, and yielding means for operating said throttle means and responsive to the varying degrees of vacuum in said intake passage, the parts being so constructed that the varying positions of said throttle means are directly related to the varying degrees of tension of said spring whereby the effective opening in said intake passage will maintain a constant balance between the force exerted upon the yielding means by the partial vacuum in said passage and the degree of tension on said spring at a given engine speed under all load conditions.

7. A governor for internal combustion engines, having in combination with the intake passage, throttle means arranged to vary the effective size of the opening through said intake passage, and yielding means for operating said throttle means and responsive to the varying degrees of vacuum in said intake passage, the variance in the effective size of the opening in said intake passage as caused by said throttle means being disproportionately greater or less as the throttle approaches its open or closed limits than the corresponding movements of said yielding means caused by the varying degrees of vacuum in said passage.

8. A governor device for explosive engines comprising in combination with an intake passage and a valve therefor, a chamber communicating with said passage and having a diaphragm therein, a controlling spring for said diaphragm, and means for correlating the diaphragm with the valve whereby to cause the valve to induce in the intake passage for all degrees of opening a degree of vacuum capable of exerting at a set speed a force upon the diaphragm equal to the opposing force of the spring.

9. A governor device for explosive engines comprising in combination with an intake passage and a valve therefor, a chamber communicating with said passage and having a diaphragm therein, a controlling spring for said diaphragm, and means connecting said diaphragm with said valve adapted to transmit the movements of the diaphragm to the valve at a disproportionately increasing or decreasing rate as the valve approaches its open or closed limits, said diaphragm and chamber being adapted to coact so that as the degree of vacuum in the chamber increases the effective area of the diaphragm decreases.

10. A governor device for explosive engines comprising in combination with an intake passage and a valve therefor, a chamber communicating with said passage and having a diaphragm therein, a controlling spring for said diaphragm, and means for correlating the diaphragm with the valve whereby to cause the valve to induce in the intake passage for all degrees of opening a degree of vacuum capable of exerting a force upon the diaphragm at a set speed equal to the opposing force of the spring, said diaphragm and chamber being adapted to coact so that as the degree of vacuum in the chamber increases the effective area of the diaphragm decreases.

11. A governor for internal combustion engines comprising, in combination with an intake passage having a controlling valve, a chamber communicating with said passage and having a flexible member or diaphragm therein, a controlling spring for said diaphragm and a series of links and levers connecting said diaphragm with said valve whereby to transmit the movements of the diaphragm to the valve at a disproportionately increasing or decreasing rate as the valve approaches its open or closed limits, said diaphragm and chamber being adapted to coact to vary the effective area of the diaphragm as it approaches the limit of its movement under the action of the vacuum in the intake passage.

12. A governor for explosive engines comprising, in combination with an intake passage and a valve therefor, a chamber communicating with said passage and having a diaphragm therein, a controlling spring for said diaphragm, and means operatively connecting said diaphragm with said valve, said diaphragm and chamber being adapted to coact so that as the degree of vacuum in the chamber increases the effective area of the diaphragm decreases.

13. A governor for explosive engines, comprising, in combination with the intake passage of the engine, a throttle valve for said passage, a casing supported by the engine, a chamber within said casing and having a suction-responsive member therein, means connecting said chamber with the intake passage whereby the varying degrees of vacuum in said passage are transmitted to said member, an operating stem fixed to said suction-responsive member, a spring surrounding said stem and tending to resist the movements of said member by the suction of the engine, and means operatively connecting said stem with said throttle, said means including a series of links and levers operatively associated with said stem exterior of said chamber and inclosed within said casing.

14. A governor for explosive engines comprising, in combination with an intake passage having a valve therein, a chamber communicating with said passage at a point between the valve and the engine, a diaphragm in said chamber, a stem fixed to said diaphragm and movable relative to said chamber, means carried solely by the chamber for guiding said stem, a spring surrounding said stem and adapted to control the movements thereof by said diaphragm, means operatively connecting said stem with said valve including a series of links and levers, and a sectional casing for inclosing said chamber and associated parts.

15. The combination set forth in claim 14 wherein the operative connection between the valve and said rod includes a lever having a forked end and a block pivoted on the rod and slidably engaged by the forked end of the lever.

16. A means for governing internal combustion engines comprising, in combination with the intake passage to the engine, a device responsive to the varying degrees of suction in said intake passage, and a valve device for controlling the effective size of said intake passage and operatively associated with said suction responsive device to be moved by the latter, whereby the effective size of said intake passage will be varied by said valve device to a disproportionately increasing or decreasing degree as the valve device moves toward or from its extreme open position.

17. A means for governing internal combustion engines comprising, in combination with the intake passage to the engine, valve means in said passage, a device controlled by the suction of the engine, and means operatively associating said valve means with said suction controlled device, whereby said valve means is arranged to effect a disproportionately larger or smaller opening through the passage as the valve approaches its open or closed limits of movement.

18. The combination with the intake passage of an explosive engine and a controlling valve therefor, of a governor device for controlling the movement of said valve including a spring-tensioned diaphragm subject to the vacuum in the intake passage, and a connection between said member and said valve comprising a series of links and levers relatively arranged so that the movements of the diaphragm are transmitted disproportionately to the valve member whereby the valve member is adapted for all degrees of opening to induce in the passage a vacuum capable of exerting a force upon the diaphragm exactly equal to the opposing spring tension at a predetermined speed.

19. A governor device for explosive engines comprising, in combination with an intake passage and a valve therefor, a chamber communicating with said passage and having a diaphragm therein, a controlling spring for said diaphragm, and means connecting said diaphragm with said valve adapted to transmit the movements of the diaphragm to the valve at a disproportionately increasing or decreasing rate as the valve approaches its open or closed limits.

20. The combination with an intake passage of an explosive engine, of a valve member in said passage, spring means tending to hold the valve member in its open position, and a suction responsive device operable as the valve member approaches its closed position with a disproportionately decreasing variation of the effective opening through said passage.

21. The combination with an intake passage of an explosive engine, of a valve for controlling said passage, and a governor device controlled by the varying degree of vacuum in the intake passage and operable as the valve member approaches its closed position at a gradually decreasing rate so as to produce a disproportionately decreasing variation of the effective opening through the passageway.

22. The combination with an intake passage of an explosive engine, of a valve member for controlling said passage, and a governor device for said valve member controlled by the varying degrees of vacuum in the passage between the valve member and the engine and including a speed responsive member, a spring tending to resist the movements of said speed-responsive member, and operative connections between said member and the valve, whereby the valve member is adapted to vary the effective opening through the passage and hence the degree of vacuum therein so that the force exerted by the vacuum upon the speed-responsive member exactly balances the opposing spring tension under varying loads and at a given speed.

23. The combination with an intake passage of an explosive engine, of a butterfly valve for controlling said passage, and a governor device for said valve including a member operable by the suction of the engine, and a connection between said member and said valve adapted to transmit to said valve a movement relatively greater when the valve member is near its open limit of movement than when near its closed limit of movement.

24. The method of controlling internal combustion engines which consists in subjecting a spring-controlled suction-responsive member to the suction of the engine and disproportionately varying the effective opening through the intake passage of the engine so as to control the degree of suction whereby the force exerted by the suction upon the suction responsive member to move it in one direction will under varying loads exactly balance at a given speed the force exerted by the spring upon the suction-responsive member to move it in the other direction.

25. The method of governing internal combustion engines which consists of subjecting a spring-controlled diaphragm to the suction of the engine whereby to move the diaphragm against the action of its spring in one direction, and transmitting the movements of the diaphragm to a valve member within the intake passage leading to the engine in a manner to vary the degree of suction in the intake passage so that the force exerted by the suction upon the diaphragm will under varying loads balance at a given speed the force exerted thereon by the spring.

26. The method of governing internal combustion engines which consists in subjecting a valve-controlling means, such as a spring controlled diaphragm, to the partial vacuum in the intake passage of the engine, and varying the effective opening through the passageway to induce under varying loads a degree of vacuum in the passageway sufficient to actuate the diaphragm so as to cause it to control the valve to maintain a set speed.

27. A governor for internal combustion engines comprising, in combination, with an intake passage, a valve for controlling said passage, a chamber having a suction-responsive member therein, a pipe connection between said chamber and said passage whereby the partial vacuum in the intake passage is transmitted to said member, and a relief cock interposed in said pipe connection.

28. A governor for internal combustion engines comprising in combination with a sectional intake passage for the engine, a valve casing adapted to be interposed between the sections of said passage and having a valve therein, and means for actuating said valve comprising a chamber located at a spaced interval from said passage and having a suction-responsive member therein, a pipe connection leading from said chamber to a point in the valve casing in the intake passage between the valve and the engine cylinders, and means operatively connecting said suction-responsive member with said valve including a shaft journaled at one end of said valve casing, and a second casing inclosing said chamber and providing a bearing for the other end of said shaft.

29. A governor for internal combustion engines comprising, in combination with a sectional intake passage for the engine, a valve casing adapted to be interposed between the sections of said passage and having a valve therein, and means for actuating said valve comprising a chamber having a suction-responsive member therein, a pipe connection leading from said chamber to a point in the valve casing in the intake passage between the valve and the engine cylinders, means operatively connecting said suction-responsive member with said valve, and means for inclosing said chamber.

30. A governor for internal combustion engines comprising, in combination with a sectional intake passage for the engine, a valve casing adapted to be interposed between the sections of said passage and having a valve therein, and means for actuating said valve comprising a chamber having a suction-responsive member therein, a pipe connection leading from said chamber to a point in the valve casing in the intake passage between the valve and the engine cylinders, a supporting casing adapted to be detachably secured to the engine and inclosing said chamber, and means for connecting the suction-responsive member to said valve including a plurality of levers inclosed by said supporting casing.

31. A governor for internal combustion engines comprising, in combination with an intake pipe of sectional construction, a valve casing adapted to be interposed between the sections of said pipe and having a valve therein for controlling the passage through said pipe, a chamber having a suction-responsive member therein, means for supporting and wholly inclosing said chamber, means operatively connecting said suction-responsive member with said valve, and a connection between said valve chamber and said inclosing means establishing communication between said chamber and the intake passage at a point in said passage between the valve and the engine cylinders, said connection having an accessible portion between the supporting means and the valve casing provided with a relief cock.

32. A governor for internal combustion engines comprising, in combination with an intake pipe having a valve therein for controlling the passage through said pipe, a chamber having a suction-responsive member therein, means for supporting and wholly inclosing said chamber, means operatively connecting said suction-responsive member with said valve, and a connection between said valve chamber and said inclosing means establishing communication between said chamber and the intake passage at a point in said passage between the valve and the engine cylinders, said chamber having an accessible portion between the supporting means and the valve casing provided with a relief cock.

33. The combination with an engine having an intake passage, of controlling means for the engine comprising a casing arranged to be interposed in said passage and having a valve therein, a second casing having a chamber therein, a suction-responsive member in said chamber, means establishing communication between said chamber and said intake passage, a shaft journaled at its opposite ends in said casings and carrying at one end said valve, and a connection between said member and said shaft inclosed within the second mentioned casing.

34. The combination with an engine having an intake passage, of controlling means for the engine comprising a casing arranged to be interposed in said passage and having a valve therein, a second casing having a chamber therein, a suction-responsive member in said chamber, means establishing communication between said chamber and said intake passage, a supporting casing for said chamber, a shaft journaled at its opposite ends in said casings and carrying at one end said valve, and a connection between said member and said shaft, said shaft having a flexible joint therein.

35. The combination with an engine having an intake passage, of controlling means for the engine comprising a valve for said passage, a casing having a chamber therein, a suction-responsive member in said chamber, means establishing communication between said chamber and said intake passage, a shaft journaled at one end in said casing and carrying said valve at its other end, and a connection between said member and said shaft inclosed within the second mentioned casing.

36. The combination with an engine having an intake passage, of controlling means for the engine comprising a valve for said passage, a casing having a suction-responsive member therein providing a closed chamber, means establishing communication between said closed chamber and said intake passage, a stem fixed to said suction-responsive member and guided in its movements by said casing, a bearing member on said stem, a compression spring interposed between said bearing member and said casing resisting the movements of said suction-responsive member by the varying degrees of vacuum in the intake passage, means operatively connecting said stem with said valve, and a second casing adapted to be supported upon the engine and to inclose the first casing and associated parts.

37. In an internal combustion engine, an intake passage, and means operable when the speed of the engine varies above and below a predetermined rate to vary the effective opening through the intake passage, said means including a throttle for said passage, and a member subject to the suction of the engine and operatively associated with said throttle whereby to accomplish a relatively greater opening or closing effect when the throttle is near its open limit of movement than when near its closed limit of movement.

38. In an internal combustion engine, an intake passage, and means operable when the speed of the engine varies above and below a predetermined rate to vary the effective opening through the intake passage, said means including a throttle for said passage, and a spring-controlled member operatively associated with said throttle and subject to the suction of the engine whereby the varying degrees of vacuum induced in the intake passage will actuate said member against the action of its controlling spring to accomplish a relatively greater opening or closing effect when the throttle is near its open limit of movement than when near its closed limit of movement.

In testimony whereof I have hereunto set my hand.

JARVIS S. JENNINGS, Jr.